(12) United States Patent
Hampton et al.

(10) Patent No.: US 10,633,084 B2
(45) Date of Patent: Apr. 28, 2020

(54) GEODESIC COMPOSITE STRUCTURES

(71) Applicant: Bell Helicopter Textron Inc., Fort Worth, TX (US)

(72) Inventors: Dalton T. Hampton, Fort Worth, TX (US); Timothy Kent Ledbetter, Euless, TX (US); Drew A. Sutton, Lexington, KY (US); Bryan W. Marshall, Mansfield, TX (US); Paul Sherrill, Grapevine, TX (US); Frank B. Stamps, Colleyville, TX (US); James Donn Hethcock, Colleyville, TX (US); Andrew Paul Haldeman, Fort Worth, TX (US); Paul K. Oldroyd, Azle, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 98 days.

(21) Appl. No.: 15/687,350

(22) Filed: Aug. 25, 2017

(65) Prior Publication Data

US 2019/0061930 A1  Feb. 28, 2019

(51) Int. Cl.
| | |
|---|---|
| B64C 27/473 | (2006.01) |
| B64C 27/06 | (2006.01) |
| B64F 5/40 | (2017.01) |
| B29C 73/04 | (2006.01) |
| B64C 1/08 | (2006.01) |
| B29C 44/44 | (2006.01) |
| B64C 3/22 | (2006.01) |
| B29K 63/00 | (2006.01) |

(Continued)

(52) U.S. Cl.
CPC .......... B64C 27/473 (2013.01); B29C 44/445 (2013.01); B29C 73/04 (2013.01); B64C 1/08 (2013.01); B64C 3/22 (2013.01); B64C 27/06 (2013.01); B64F 5/40 (2017.01); *B29C 44/3415* (2013.01); *B29K 2063/00* (2013.01); *B29K 2105/048* (2013.01); *B29K 2307/04* (2013.01); *B29L 2031/082* (2013.01); *B64C 2027/4736* (2013.01)

(58) Field of Classification Search
CPC ............... B64C 27/473; B64C 27/06; B64C 2027/4736; B29C 44/445; B29C 73/04; B29C 44/3415; B29C 44/1228; B29C 44/18; B64F 5/40; B29L 2031/082; B29K 2105/048; B29K 2307/04; B29K 2063/00; F01D 5/048; F01D 5/14; F01D 5/147
USPC ........................ 416/230; 264/45.3, 45.4, 46.4
See application file for complete search history.

(56) References Cited

U.S. PATENT DOCUMENTS

| | | | | |
|---|---|---|---|---|
| 3,396,923 A | * | 8/1968 | Windecker | B64D 37/02 156/155 |
| 3,562,370 A | * | 2/1971 | Shannon | B29O 70/66 264/45.3 |

(Continued)

*Primary Examiner* — Hung Q Nguyen
*Assistant Examiner* — Susan E Scharpf
(74) *Attorney, Agent, or Firm* — Patent Capital Group

(57) ABSTRACT

In one embodiment, a method may comprise coupling a plurality of reinforcement fibers to a plurality of spherical components; inserting the plurality of spherical components into an enclosure; and heating the enclosure to cause the plurality of spherical components to expand, wherein the plurality of spherical components expands to form a geodesic structure, wherein the geodesic structure comprises a plurality of polyhedron components configured in a geodesic arrangement.

10 Claims, 3 Drawing Sheets

(51) Int. Cl.
  *B29K 307/04*   (2006.01)
  *B29L 31/08*    (2006.01)
  *B29C 44/34*    (2006.01)
  *B29K 105/04*   (2006.01)

(56) References Cited

U.S. PATENT DOCUMENTS

| | | | | |
|---|---|---|---|---|
| 3,608,010 A * | 9/1971 | Stayner | B29C 70/66 | 264/122 |
| 3,619,436 A * | 11/1971 | Gruss | A63D 9/00 | 264/45.4 |
| 3,656,317 A * | 4/1972 | Gray | B64G 1/58 | 239/127.3 |
| 3,754,840 A * | 8/1973 | Zincone | B64O 27/473 | 416/226 |
| 4,111,713 A * | 9/1978 | Beck | B29C 70/66 | 106/409 |
| 4,146,563 A * | 3/1979 | Ratafia | B29C 44/505 | 264/51 |
| 4,243,761 A * | 1/1981 | Savey | B29C 44/1209 | 264/101 |
| 4,247,650 A * | 1/1981 | Shimizu | B29C 67/20 | 264/51 |
| 4,256,803 A * | 3/1981 | Savey | C08J 9/147 | 264/101 |
| 4,470,862 A * | 9/1984 | More | B29O 70/34 | 156/245 |
| 4,476,076 A * | 10/1984 | Saidla | C08J 9/08 | 156/169 |
| 4,538,780 A * | 9/1985 | Roe | B64C 3/20 | 244/123.5 |
| 4,559,272 A * | 12/1985 | Oldham | C08G 59/28 | 264/272.13 |
| 4,681,718 A * | 7/1987 | Oldham | B29C 35/0222 | 264/102 |
| 4,687,691 A * | 8/1987 | Kay | B29O 44/1266 | 428/73 |
| 4,724,250 A * | 2/1988 | Schubert | C08G 18/089 | 106/18.16 |
| 4,780,484 A * | 10/1988 | Schubert | C08G 18/791 | 521/106 |
| 4,806,077 A * | 2/1989 | Bost | B64O 27/473 | 416/226 |
| 4,867,931 A * | 9/1989 | Cochran, Jr. | B01J 13/04 | 264/9 |
| 5,123,814 A * | 6/1992 | Burdick | F04D 29/388 | 29/889.3 |
| 5,665,785 A * | 9/1997 | McClellan | B60C 1/00 | 521/51 |
| 6,350,337 B1 * | 2/2002 | Nakamura | B29C 33/52 | 156/155 |
| 6,589,470 B2 * | 7/2003 | Fried | B29C 33/34 | 264/102 |
| 8,668,800 B2 * | 3/2014 | Guitton | B29O 70/68 | 156/173 |
| 2014/0271215 A1 * | 9/2014 | Measom | B23P 15/04 | 416/224 |

* cited by examiner

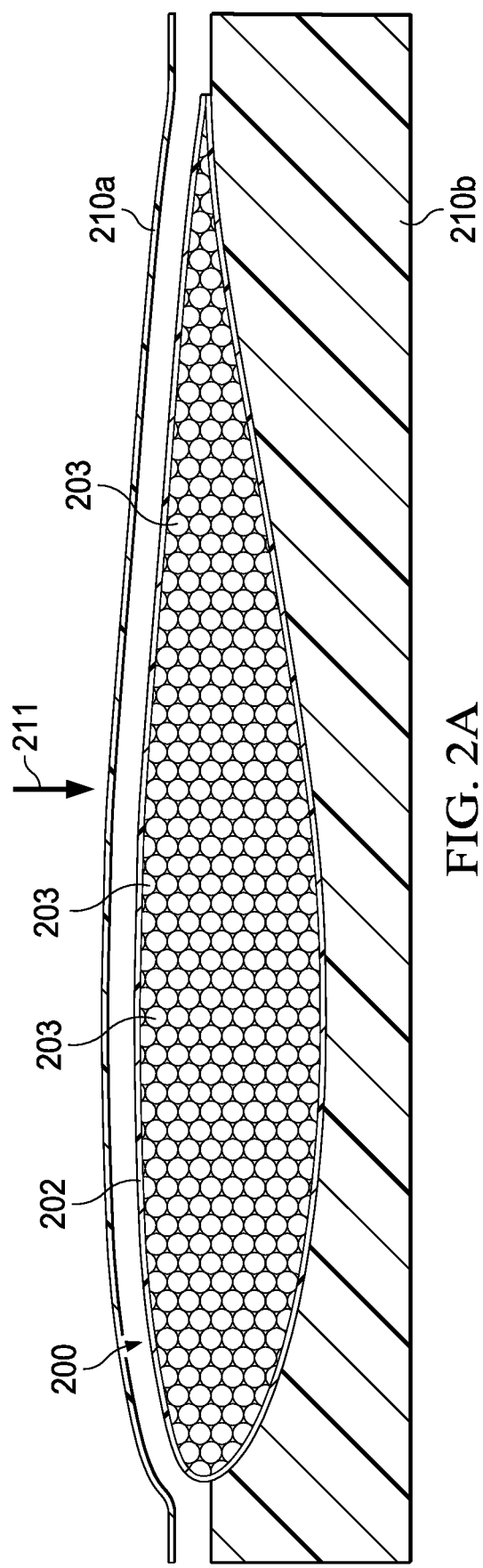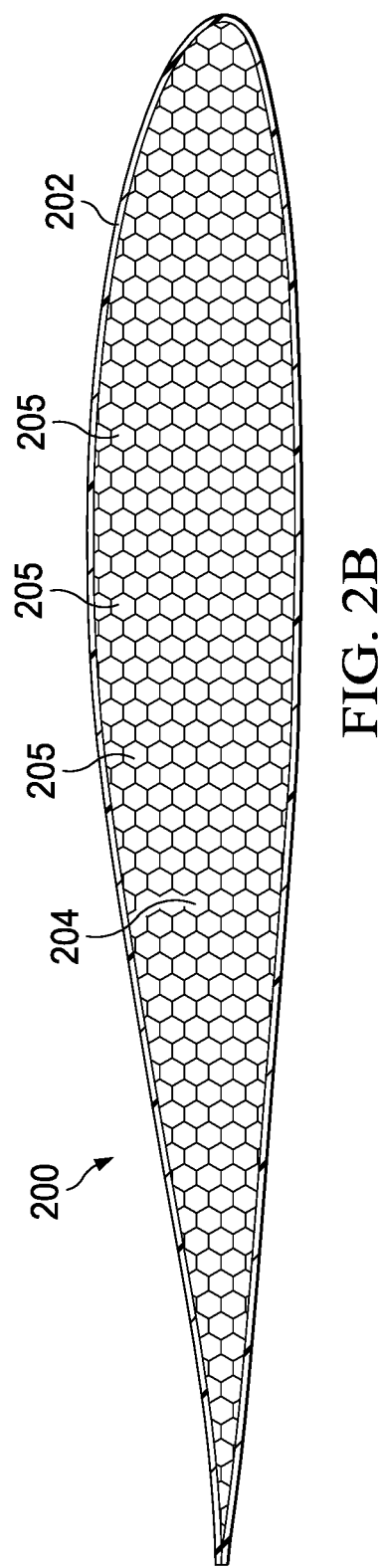
FIG. 2A
FIG. 2B

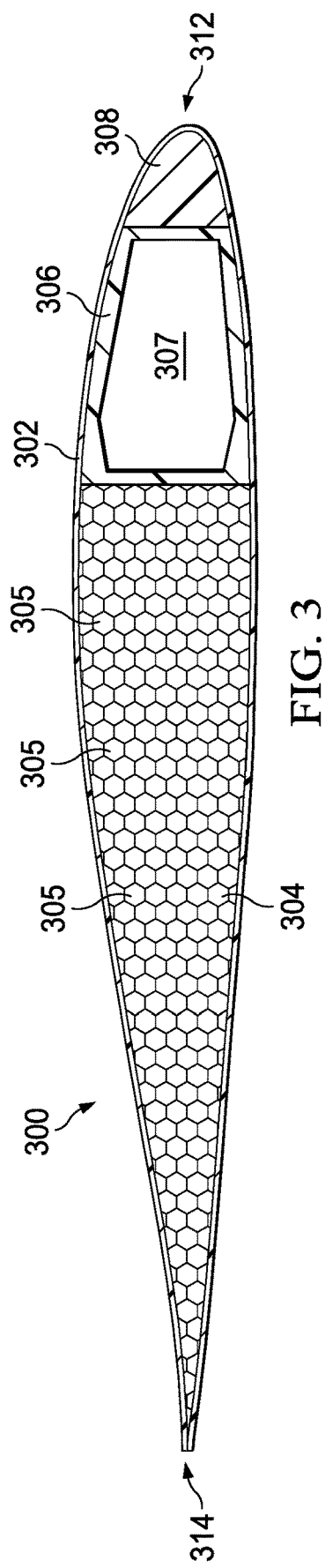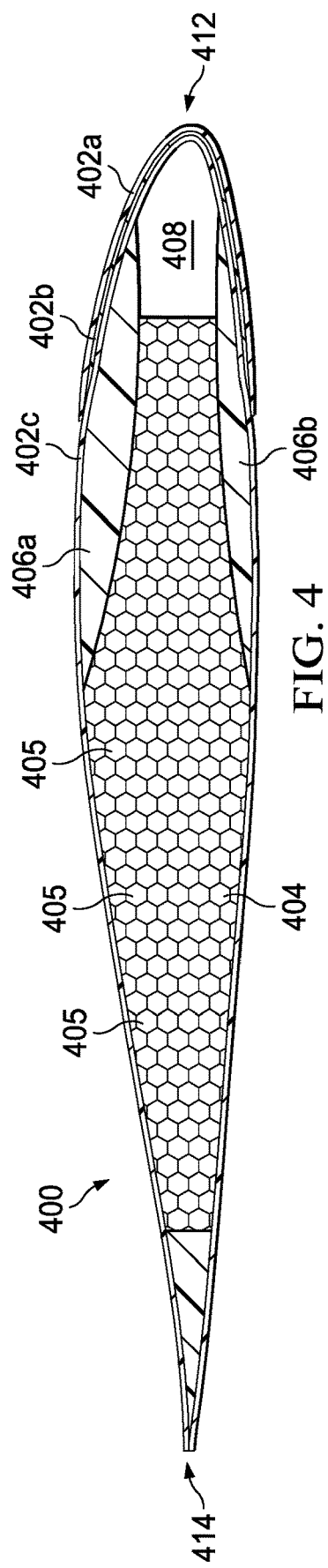

GEODESIC COMPOSITE STRUCTURES

TECHNICAL FIELD

This disclosure relates generally to manufacturing and design of composite structures, and more particularly, though not exclusively, to geodesic composite structures.

BACKGROUND

Aircraft are often designed using composite materials. A composite material, for example, may be a combination of different materials integrated together to achieve certain structural properties. It may be challenging, however, to manufacture composite materials with strong structural properties in a cost-efficient manner.

SUMMARY

According to one aspect of the present disclosure, a method may comprise coupling a plurality of reinforcement fibers to a plurality of spherical components; inserting the plurality of spherical components into an enclosure; and heating the enclosure to cause the plurality of spherical components to expand, wherein the plurality of spherical components expands to form a geodesic structure, wherein the geodesic structure comprises a plurality of polyhedron components configured in a geodesic arrangement.

BRIEF DESCRIPTION OF THE DRAWINGS

FIGS. 2A-2B illustrate an example manufacturing process for a geodesic rotor blade.

FIGS. 3 and 4 illustrate example embodiments of a geodesic rotor blade.

DETAILED DESCRIPTION

Figure 1:
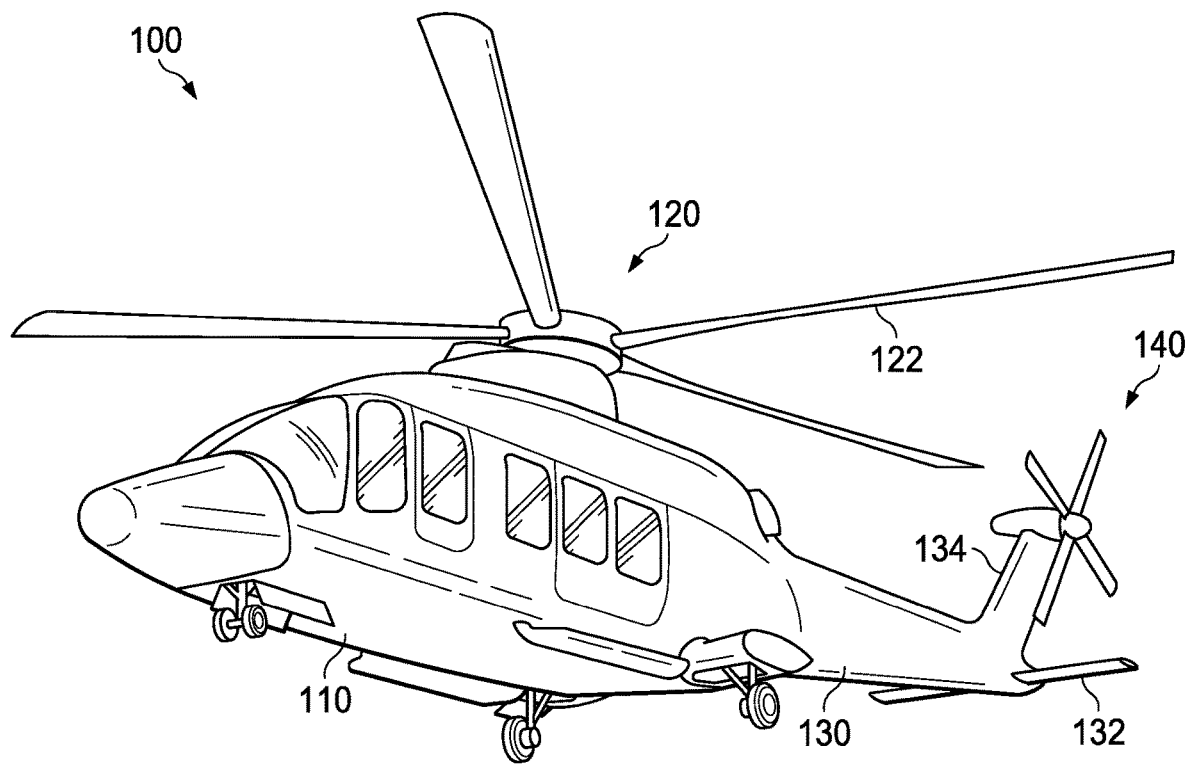
FIG. 1 illustrates an example rotorcraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 100. Rotorcraft 100 includes a fuselage 110, a rotor system 120, and an empennage 130. The fuselage 110 is the main body of the rotorcraft, which may include a cabin (e.g., for crew, passengers, and/or cargo) and/or may house certain mechanical and electrical components (e.g., engine(s), transmission, and/or flight controls). The rotor system 120 is used to generate lift for the rotorcraft using a plurality of rotating rotor blades 122. For example, the engine(s) of the rotorcraft can be used to generate torque to cause the rotor blades 122 to rotate, which in turn generates lift. Moreover, the pitch of each rotor blade 122 can be adjusted in order to selectively control direction, thrust, and lift for the rotorcraft. The empennage 130 of the rotorcraft includes a horizontal stabilizer 132, vertical stabilizer 134, and tail rotor system 140. The horizontal stabilizer 132 and vertical stabilizer 134 may be respectively used to provide horizontal and vertical stability for the rotorcraft. Moreover, the tail rotor system 140 may be used to provide anti-torque and/or direction control for the rotorcraft.

In some cases, certain components of rotorcraft 100 may be made from composite materials. A composite material is a combination of different materials integrated together to achieve certain structural properties. Moreover, the properties of a three-dimensional composite structure are typically superior to the properties of the underlying materials individually. For example, certain composite materials may be lightweight yet relatively strong, rendering them particularly suitable for aircraft and other applications where weight and/or strength are critical to performance. Accordingly, many components of rotorcraft and other aircraft are often designed using composite materials, including flight control surfaces, wings, fairings, spoilers, stabilizers, propellers, rotor blades, engine blades, airframe structural components, the fuselage, various interior components (e.g., floors, walls, fixtures), and so forth.

As an example, the rotor blades 122 of rotorcraft 100 can be designed using composite materials. In some cases, for example, a rotor blade 122 may be designed using a honeycomb core (e.g., aluminum and/or Nomex honeycomb), large cell carbon core, and/or foam core, among other examples. For example, an aluminum or Nomex honeycomb core can be formed using composite materials and can be inserted into the body of the rotor blade 122, using an adhesive to bind the honeycomb core to the outer skin of the blade. These types of honeycomb core may be easy to manufacture, but may be relatively limited in strength. For example, while these honeycomb cores may be suitable for distributing stress originating from above or below the honeycomb, they are typically ineffective for stress that originates from the sides. A large cell carbon core is also formed using composite materials (e.g., layers of graphite), and may be strong but may be difficult to manufacture, as the manufacturing process may require additional steps.

Accordingly, this disclosure describes various embodiments of high-strength geodesic structures that can be used in the design of aircraft components. For example, in geometry, a polyhedron is a three-dimensional (3D) shape with polygonal faces (e.g., faces that are triangular, hexagonal, and/or octagonal, among other examples), and a geodesic shape is an arrangement of polyhedrons that collectively form or approximate a curved or spherical shape. Moreover, in some cases, an object or structure may be formed using a geodesic design to provide high strength and structural integrity. For example, the underlying polyhedral elements of a structure with a geodesic design have a structurally rigid 3D shape that distributes stress across the structure effectively, regardless of the direction of the stress relative to the structure. In this manner, the geodesic structure can withstand heavy loads relative to its size from all directions.

A geodesic structure, however, can be difficult to manufacture. Accordingly, this disclosure describes various embodiments of high-strength geodesic structures that can be manufactured in an easy and cost-efficient manner. In some embodiments, for example, a 3D geodesic structure can be formed by heating an enclosure of fiber-reinforced spherical components. The spherical components, for example, may be small hollow spheres attached with fiber-reinforcements. An enclosure can be filled with these spheres, and the enclosure can then be heated to cause the spheres to expand. As the spheres expand, they press against each other and are eventually deformed into small polyhedrons arranged adjacently, thus forming a geodesic structural design. The geodesic structure can then be cured to cause it to become rigid in all directions, resulting in a structure with high shear strength due to the strong geodesic structural design and the presence of fiber reinforcements throughout the volume of the structure.

Accordingly, in some embodiments, these high-strength geodesic structures can be used for aircraft design, such as for the design of flight control surfaces, wings, fairings, spoilers, stabilizers, propellers, rotor blades, engine blades, airframe structural components, fuselages, various interior components (e.g., floors, walls, fixtures), and so forth. In some embodiments, for example, these geodesic structures could be used in the design of the rotor blades 122 of rotorcraft 100 (e.g., to form the body or core of the blades). These geodesic structures can also be used to repair damaged portions of existing aircraft components (e.g., including components that were not originally designed using geodesic structures). Finally, these geodesic structures can similarly be used for other applications, including the design of land-based vehicles (e.g., cars, buses, trucks), water-based vehicles (e.g., boats, submarines), spacecraft, and/or any other applications where weight and/or strength are critical to performance. Moreover, these geodesic structures are particularly beneficial for both commercial and military purposes, as they can be used to form strong composite structures with high repeatability, but in a cost-efficient manner that also renders them easily repairable.

Example embodiments associated with the design of geodesic structural components are described below with more particular reference to the remaining FIGURES. It should be appreciated that rotorcraft 100 of FIG. 1 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples. Moreover, the described embodiments can also be used for other non-aircraft implementations, including land, water, and/or space-based vehicles, among other examples.

FIGS. 2A-B illustrate an example manufacturing process for a geodesic rotor blade 200. In some embodiments, for example, a rotor blade 200 of a rotorcraft can be designed using a three-dimensional (3D) geodesic structure 204. The geodesic structure 204, for example, may be used to provide a high-strength core for the rotor blade 200. For example, a geodesic structure 204 may be a structure formed using a geodesic design, such as an arrangement of polyhedral objects 205 that collectively form or approximate a curved or spherical shape. The underlying polyhedral objects 205 may be objects with 3D shapes whose faces are polygonal (e.g., an object with hexagonal faces). These polyhedral objects 205 have a structurally rigid 3D shape that distributes stress across the geodesic structure 204 effectively, regardless of the direction that the stress originates from. In this manner, the geodesic structure 204 can withstand heavy loads relative to its size from all directions. Accordingly, in some embodiments, a geodesic structure 204 can be leveraged in the design of a rotor blade 200 to provide strength and structural integrity. A geodesic structure 204, however, can be difficult and/or expensive to manufacture. Accordingly, the illustrated embodiment uses an approach for manufacturing a high-strength geodesic structure 204 in an easy and cost-efficient manner.

The illustrated embodiment depicts an example of the manufacturing process for a rotor blade 200 with a high-strength geodesic structure 204 as the blade core. The geodesic structure 204 is formed by heating an enclosure of fiber-reinforced spherical components 203. The spherical components 203, for example, may be small hollow spheres attached with fiber reinforcements. The size of the spheres 203 may vary in different embodiments. For example, different sized spheres 203 may achieve different structural properties, and thus the size of the spheres 203 may depend on the desired structural properties. In some embodiments, for example, the size of the spheres 203 may be approximately ⅜-½ inches in diameter. In addition, in some embodiments, spheres 203 of multiple different sizes may be used. For example, smaller spheres 203 may be used for thin sections of the rotor blade 200, while larger spheres 203 may be used for thick sections of the rotor blade 200. The spheres 203 may be formed using any suitable approach, including rotational molding and/or extruding and blowing them into bubble form. Moreover, fibers may be attached to the spheres 203 using an adhesive. In some embodiments, for example, the spheres 203 may be made of a resin material, such as an epoxy, and the fibers may be made of a material with strong structural properties, such as graphite. Accordingly, in some embodiments, the fibers may be attached to the spheres 203 by b-staging the epoxy material of the spheres 203. For example, the epoxy material of the spheres 203 may be partially heated to cause it to become tacky, and the spheres 203 may then be bathed in reinforcement fibers to cause the fibers to stick to the spheres 203. In other embodiments, this approach could be used to form fiber-reinforced objects with non-spherical shapes that are then machined in a similar manner as existing cores.

An enclosure or cavity may then be filled with the fiber-reinforced spheres 203, and the enclosure may be heated (e.g., using an autoclave) to cause the spheres 203 to expand. As the spheres 203 expand, they press against each other and eventually deform into small polyhedrons 205 arranged adjacently (e.g., with minimal interstitial gaps), thus forming a structure 204 with a three-dimensional lattice that has a geodesic design. In some embodiments, the enclosure for the spheres 203 may be a cavity in the pre-cured rotor blade 200, thus allowing the geodesic structure 204 to be formed directly in the rotor blade 200 (e.g., by inserting the spheres 203 into an opening in the root or tip of the blade and then curing the blade), and eliminating the need for secondary bond operations. Alternatively, the enclosure for the spheres 203 may be a mold used to form the geodesic structure 204 separately (e.g., by densely filling a closed-cavity mold with the spheres 203, closing the lid, and then curing the geodesic structure 204 in the mold), and the resulting geodesic structure 204 may then be inserted and/or embedded in the rotor blade 200 using secondary bond operations. Once the geodesic structure 204 is formed, it can then be fully cured to cause it to become rigid in all directions, resulting in a structure with high shear strength due to the favorable structural properties of its geodesic design and the presence of fiber reinforcements throughout the volume of the structure.

In the illustrated embodiment, FIG. 2A depicts the rotor blade 200 during the manufacturing process before it has been cured, and FIG. 2B depicts the rotor blade 200 after the manufacturing process is complete and it has been fully cured. For example, in FIG. 2A, the rotor blade 200 has been assembled with an outer skin 202 and has been filled with the spherical components 203 that will ultimately be used to form the geodesic structure 204. In some embodiments, the rotor blade 200 may also include other composite materials and/or sections at this stage. For example, in some embodiments, the rotor blade 200 could include a foam core surrounded by the section of spherical components 203 (e.g., to cause the resulting geodesic structure 204 to form around the foam core, ultimately resulting in a core with a geodesic portion that surrounds a foam portion). The pre-cured rotor blade 200 is placed between upper and lower caul plates 210a,b of the tooling used during the curing process (e.g., to distribute pressure evenly and form smooth surfaces), and is then heated in an autoclave. The heat from the autoclave generates pressure 211 that causes the spherical components 203 to expand and press against each other, transforming them into polyhedrons 205 with an arrangement that forms a geodesic structure 204, as shown by FIG. 2B. Accordingly, the resulting rotor blade 200 has a geodesic structure 204 as its core, which provides structural strength in three-dimensions rather than only two-dimensions, and is also relatively lightweight. In this manner, a high-strength and lightweight rotor blade 200 is manufactured using a cost-efficient approach.

This approach can also be used to repair damage to existing aircraft components, regardless of whether the damaged components were originally designed using geodesic structures. For example, a damaged rotor blade can be repaired by replacing the damaged portion with a geodesic structural filling. In some embodiments, for example, the damaged portion of the rotor blade may be cut out or extracted. A mold can then be created with a similar size and shape as the extracted damaged portion, and the mold can then be used to create a geodesic structure using the process described above. The resulting geodesic structure can then be inserted and bonded into the portion of the rotor blade that was extracted, along with a new skin and/or any other requisite materials. While this approach can be used to repair a rotor blade designed with a geodesic core as described above, it can also be used to repair rotor blades designed with other types of cores, such as large cell carbon core or foam core.

FIGS. 3 and 4 illustrate example embodiments of a geodesic rotor blade. The illustrated embodiments of a geodesic rotor blade can be manufactured, for example, using the approach described throughout this disclosure.

FIG. 3 illustrates rotor blade 300. Rotor blade 300 includes a skin 302 configured to form an airfoil shape with a leading edge 312 and a trailing edge 314. In some embodiments, for example, the skin 302 may be made of a graphite, glass, or other material. Moreover, rotor blade 300 includes a geodesic core 304 formed by an arrangement of polyhedral objects 305, as described throughout this disclosure. Rotor blade 300 further includes a supporting spar structure 306. In the illustrated example, the supporting spar structure 306 is a D-spar (e.g., a spar shaped in a manner that resembles the letter D), and includes a hollow cavity 307 in the middle. Rotor blade 300 further includes a blade nose 308. In some embodiments, the blade nose 308 may be hollow, filled with tuning weights, and/or filled with a composite material, depending on the particular radial location of the blade.

FIG. 4 illustrates rotor blade 400. Rotor blade 400 includes a skin 402 configured to form an airfoil shape with a leading edge 412 and a trailing edge 414. The skin 402 includes multiple layers 402a-c near the leading edge 412 of the rotor blade 400, which taper off towards the trailing edge 414. In some embodiments, for example, the skin 402 may be made of graphite, glass, and/or other materials. Moreover, rotor blade 400 includes a geodesic core 404 formed by an arrangement of polyhedral objects 405, as described throughout this disclosure. Rotor blade 400 further includes a supporting spar structure 406. In the illustrated example, the supporting spar structure 406 is a C-spar (e.g., a spar shaped in a manner that resembles the letter C), formed using upper and lower spar caps 406a,b that are closed off by the skin 402 and the geodesic core 404. Rotor blade 400 further includes a blade nose 408. In some embodiments, the blade nose 408 may be hollow, filled with tuning weights, and/or filled with a composite material, depending on the particular radial location of the blade.

Rotor blade 300 and rotor blade 400 are merely example designs for a rotor blade with a geodesic core. In other embodiments, other designs can be used to implement a rotor blade with a geodesic core.

Figure 5:
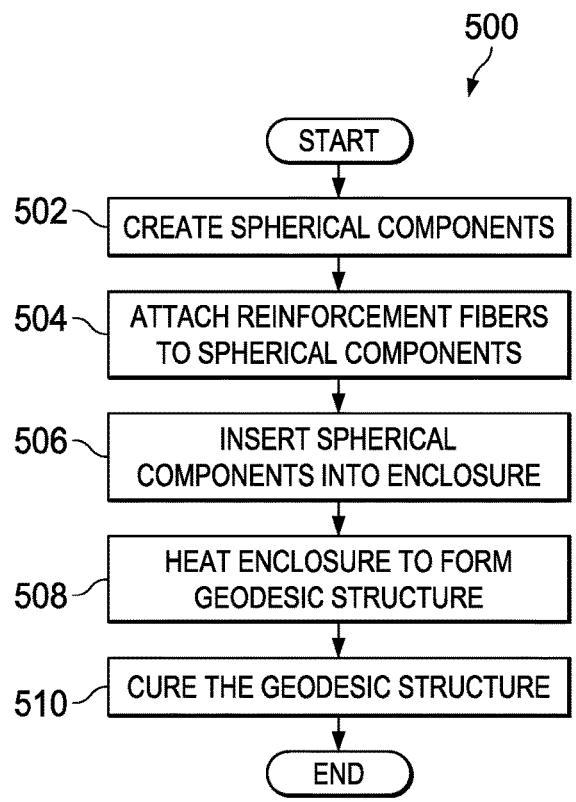
FIG. 5 illustrates a flowchart for manufacturing a geodesic composite structure.

FIG. 5 illustrates a flowchart 500 for manufacturing a geodesic composite structure. In some embodiments, for example, flowchart 500 may be used to manufacture aircraft components (e.g., rotor blades) designed using geodesic composite structures.

The flowchart may begin at block 502 by creating a plurality of spherical components. The spherical components, for example, may be small hollow spheres. Moreover, the size of the spheres may vary in different embodiments. For example, different sized spheres may achieve different structural properties, and thus the size of the spheres may depend on the desired structural properties. In some embodiments, for example, the size of the spheres may be approximately $3/8$-$1/2$ inches in diameter. In addition, in some embodiments, spheres of multiple different sizes may be used. For example, smaller spheres may be used for thin sections of a composite structure, while larger spheres may be used for thick sections of the composite structure. In some embodiments, the spheres may be formed using a resin material, such as an epoxy. Moreover, the spheres may be formed using any suitable approach, including rotational molding and/or extruding and blowing them into bubble form.

The flowchart may then proceed to block 504 to attach reinforcement fibers to the spherical components. The reinforcement fibers, for example, may be made of a material with strong structural properties, such as graphite. Moreover, the fibers may be attached to the spheres using an adhesive. For example, in some embodiments, the spheres may be made of a resin material (e.g., an epoxy), and the fibers may be attached to the spheres by b-staging the resin material of the spheres. For example, the resin material of the spheres may be partially heated and/or cured to cause it to become tacky, and the spheres may then be bathed in reinforcement fibers to cause the fibers to stick to the spheres.

The flowchart may then proceed to block 506 to insert the fiber-reinforced spheres into an enclosure. In some embodiments, for example, the enclosure may be a cavity in a pre-cured structure (e.g., an aircraft component such as a rotor blade), or the enclosure may be a closed-cavity mold. Moreover, the enclosure is densely filled with the fiber-reinforced spheres.

The flowchart may then proceed to block 508 to heat the enclosure to form a geodesic structure. In some embodiments, for example, the enclosure may be heated using an autoclave. Moreover, heating the enclosure causes the spheres to expand. As the spheres expand, they press against each other and eventually deform into small polyhedrons arranged adjacently (e.g., with minimal interstitial gaps), thus forming a structure with a three-dimensional lattice that has a geodesic design.

The flowchart may then proceed to block 510 to cure the geodesic structure. For example, after the geodesic structure is initially formed at block 508, the geodesic structure can then be fully cured to cause it to become rigid in all directions. In this manner, the resulting geodesic structure has high shear strength due to the favorable structural properties of its geodesic design and the presence of fiber reinforcements throughout the volume of the structure.

As noted above, the enclosure used to heat the spheres may be a cavity in a pre-cured component (e.g., an aircraft component such as a rotor blade) or may be a closed-cavity mold. If the enclosure is a cavity in a pre-cured component, the geodesic structure is formed directly in the component, thus eliminating the need for secondary bond operations. If the enclosure is a closed-cavity mold, however, the geodesic structure is formed separately, and is subsequently inserted and/or embedded in the target component using secondary bond operations.

Moreover, in some embodiments, the geodesic structure can be used to repair damage to an existing component, regardless of whether the damaged component was originally designed using a geodesic structure. For example, the damaged component can be repaired by replacing the damaged portion with a geodesic structure. In some embodiments, for example, the damaged portion of a component may be cut out or extracted. Moreover, the closed-cavity mold can be created with a similar size and shape as the extracted damaged portion, and the mold can then be used to create a geodesic structure using the process described above. The resulting geodesic structure can then be inserted and bonded into the portion of the component that was extracted, along with any other requisite materials.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A method, comprising:
   coupling a plurality of reinforcement fibers to a plurality of spherical components having different sizes;
   inserting the plurality of spherical components into an enclosure comprising a cavity in a pre-cured rotor blade for installation on an aircraft; and
   heating the rotor blade to cause the plurality of spherical components to expand, wherein the plurality of spherical components expands to form a geodesic structure attached to the rotor blade, wherein the geodesic structure comprises a plurality of polyhedron components configured in a geodesic arrangement for reinforcing a strength of the rotor blade.

2. The method of claim 1, wherein the plurality of spherical components comprises a plurality of hollow spherical components.

3. The method of claim 1, wherein the plurality of spherical components comprises a resin material.

4. The method of claim 3, wherein the resin material comprises an epoxy.

5. The method of claim 3, wherein coupling the plurality of reinforcement fibers to the plurality of spherical components comprises partially curing the resin material.

6. The method of claim 5, wherein partially curing the resin material comprises b-staging the resin material.

7. The method of claim 1, further comprising forming the plurality of spherical components using rotational molding.

8. The method of claim 1, wherein heating the enclosure to cause the plurality of spherical components to expand comprises heating the enclosure using an autoclave.

9. The method of claim 1, wherein the reinforcement fibers comprise graphite fibers.

10. The method of claim 1 further comprising forming the plurality of spherical components by extruding material comprising the spherical components and blowing the extruded material into bubble form.

* * * * *